United States Patent [19]

Fagert et al.

[11] 4,084,607
[45] Apr. 18, 1978

[54] LEAKAGE DRAIN FOR SINGLE LEVER CONTROL VALVE

[75] Inventors: Russell Bruce Fagert, Morgantown, W. Va.; John Louis Fogle, Lanaconing, Md.

[73] Assignee: Rockwell International Corporation, Pittsburgh, Pa.

[21] Appl. No.: 686,981

[22] Filed: May 17, 1976

Related U.S. Application Data

[63] Continuation of Ser. No. 585,941, Jun. 11, 1975, abandoned.

[51] Int. Cl.² .................... F16K 11/02; F16K 51/00
[52] U.S. Cl. .................................. 137/312; 137/359
[58] Field of Search ............... 137/312, 313, 314, 359, 137/380, 625.17; 222/108, 109, 111; 4/191, 192

[56] References Cited

U.S. PATENT DOCUMENTS

| | | | |
|---|---|---|---|
| 1,903,486 | 4/1933 | Snow | 137/312 X |
| 2,235,386 | 3/1941 | Rueckert | 137/312 X |
| 2,386,825 | 10/1945 | Turchan et al. | 137/312 X |
| 3,431,938 | 3/1969 | Sorensen et al. | 137/359 |
| 3,807,453 | 4/1974 | Dom et al. | 137/625.17 |

*Primary Examiner*—Martin P. Schwadron
*Assistant Examiner*—Richard Gerard

[57] ABSTRACT

A water control valve or faucet is comprised of a body having a through bore in which a spindle is mounted for axial movement between valve open and valve closed positions. A leakage receptacle is provided adjacent one end of the bore for receiving leakage between the spindle and bore and to conduct it to the exterior of a housing which encloses the body and receptacle.

4 Claims, 5 Drawing Figures

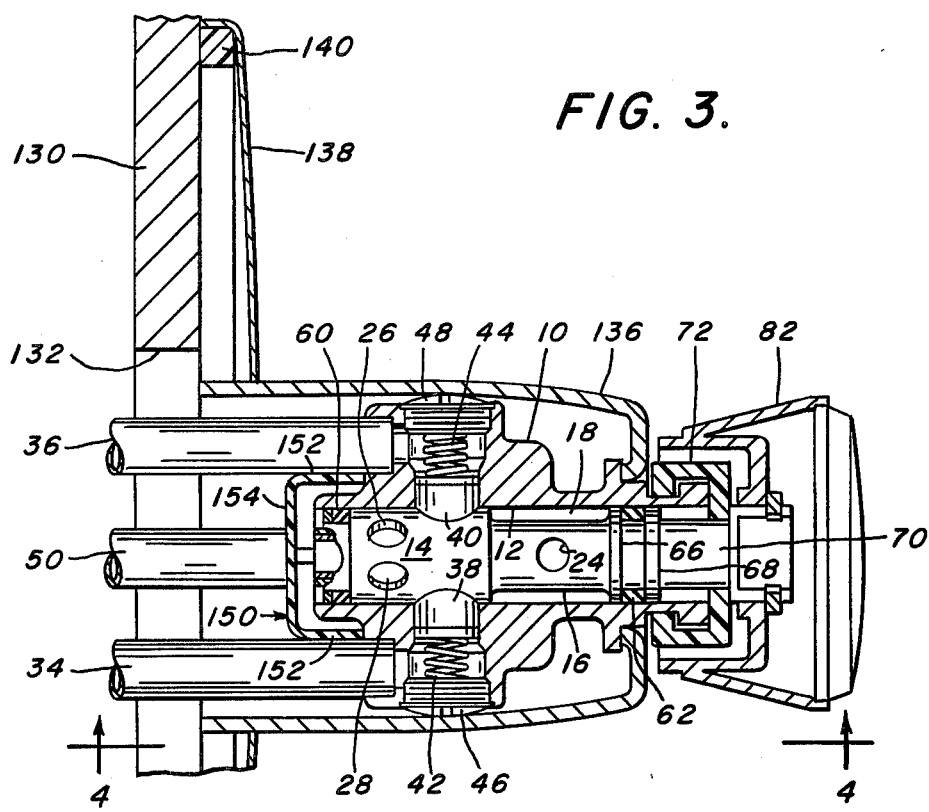
FIG. 3.
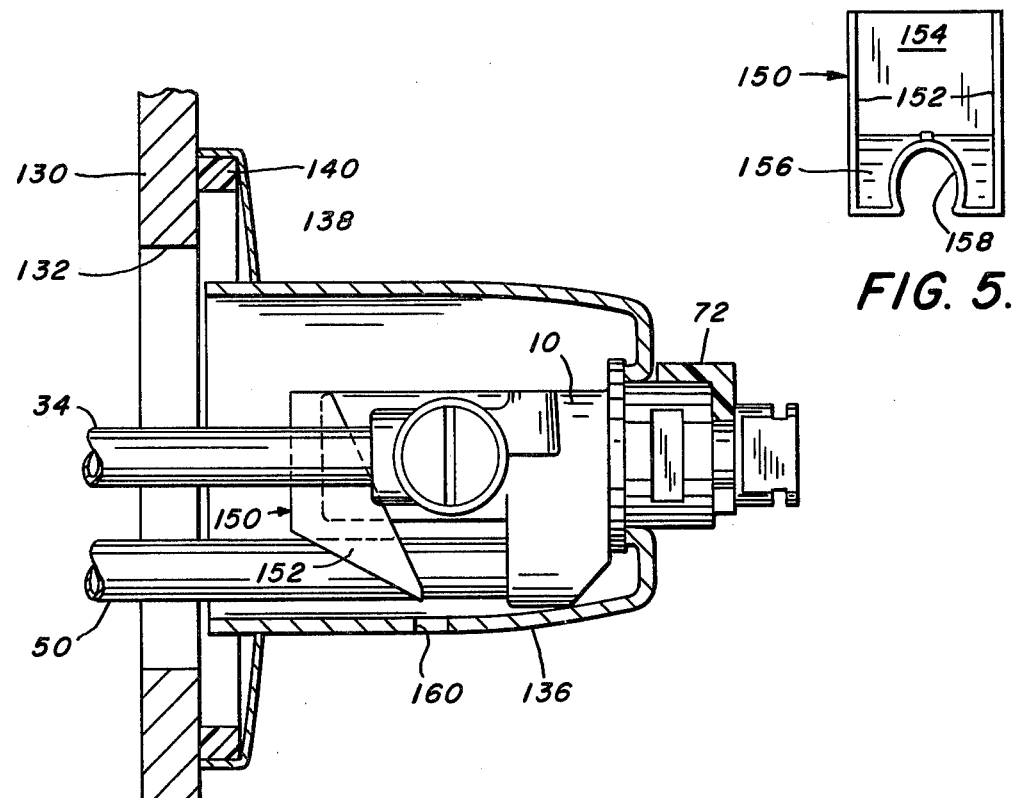
FIG. 4.
FIG. 5.

4,084,607

LEAKAGE DRAIN FOR SINGLE LEVER CONTROL VALVE

BACKGROUND OF THE INVENTION AND PRIOR ART

The invention herein relates to single lever control valves of the type shown in U.S. Pat. No. 3,807,453 particularly in FIGS. 12 and 13 thereof. In such control valves or faucets a closure member or spindle is mounted in a through bore formed in the body and is axially movable between valve open and valve closed position and is rotatably movable to adjust the temperature of the water between hot and cold conditions. If the through bore in the body within which the spindle moves could be closed at the lower end no leakage could take place at that point. However, to close the bore at its lower end would trap air between the end of the spindle and the lower portion of the bore thereby rendering the valve inoperative. In such valves, therefore, the spindle must be sealed with respect to the bore near its opposite ends, and in case of malfunction of the lower seal, leakage could accumulate within the housing and eventually find its way down through one of several openings in the sink top and onto the floor beneath the sink or the cabinet within which the sink may be enclosed, or behind the finished wall of the bath enclosure, both of which are highly undesirable conditions. It is therefore desirable to provide some means of collecting any such possible leakage between the spindle and the body and conduct it to a point where it is readily visible and where it may be disposed of in a manner satisfactory to the user of the valve. This is done by providing means to conduct any such possible leakage to the exterior of the housing enclosing the valve body where it may drain into the sink and where it may be readily visible to the user of the valve to indicate a malfunction in the seal.

OBJECTS OF THE INVENTION

Accordingly, it is a general purpose of the instant invention to provide in conjunction with the valve herein described a means of preventing an accumulation of leakage between the valve closure member and the valve body at undesirable locations.

It is another object of this invention to conduct any such leakage to the exterior of the valve housing where it may drain into the sink and where it is readily visible to the user of the valve.

Other objects of the invention will be apparent from the description and specifications hereinafter set forth.

DESCRIPTION OF THE DRAWINGS

FIG. 3 is a top plan view in section of a bathtub-shower diverter valve embodying the instant invention.

FIG. 4 is a view in the direction indicated by the arrows 4—4 in FIG. 3, with the housing shown in section and with the operating handle omitted.

FIG. 5 shows the leakage receptacle shown in FIG. 4 as viewed from the right in FIG. 4 but apart from the assembly of FIG. 4.

DESCRIPTION OF THE PREFERRED EMBODIMENTS

Figures 1, 2:
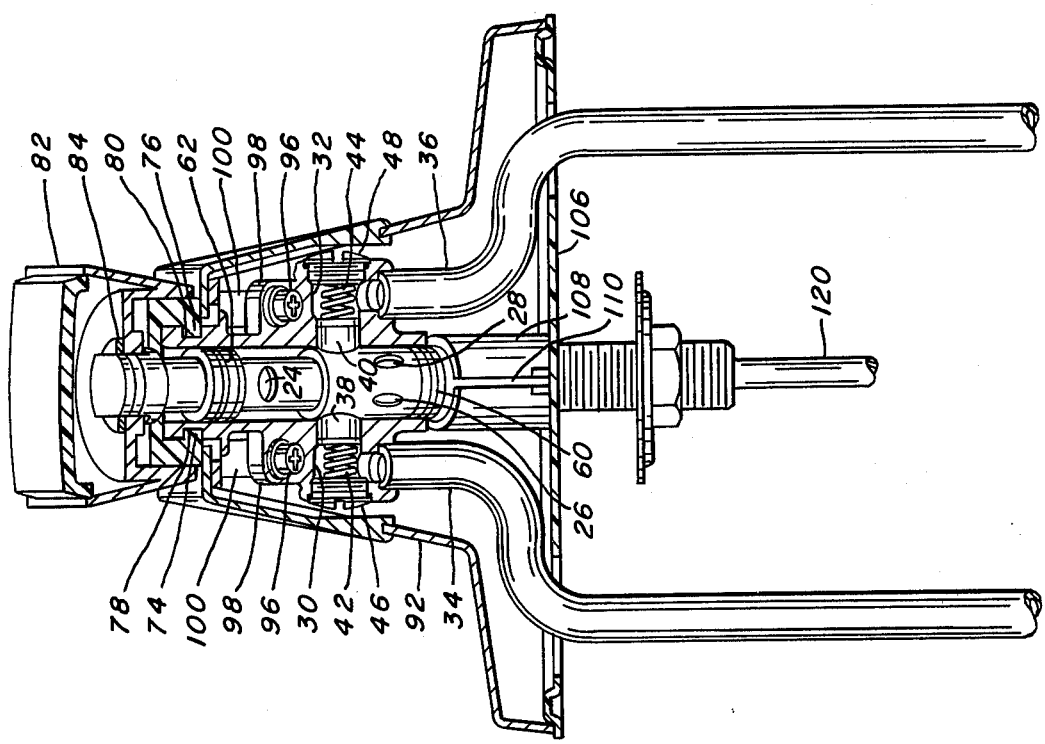
FIG. 1 is a side elevation view in section of a lavatory sink valve embodying the instant invention.
FIG. 2 is a sectional view taken along the lines 2—2 of FIG. 1 viewed in the direction indicated by the arrows.

Referring to FIG. 1 and 2 of the drawings a body 10 has extending therethrough a cylindrical bore 12 open at each end, in which a spindle 14 is mounted for axial and rotary motion. The spindle has a reduced portion 16 which forms a chamber 18 with bore 12. An elongated passageway 20 formed interiorly of spindle 14 has its lower end closed by plug 22. Openings 24 in the wall of the spindle place passage 20 in communication with chamber 18. Openings 26 and 28 formed in the wall of spindle 14 near its lower end communicate with the passage 20. Diametrically opposed inlet ports 30 and 32 are formed in the side wall of body 10 and are in communication respectively with hot water supply tube 34 and cold wter supply tube 36. Seal members 38 and 40 are biased against the exterior surface of spindle 14 by means of springs 42 and 44 which are respectively compressed between screw 46 and seal 38 and screw 48 and seal 40. As shown in FIGS. 1 and 2 the valve is in the closed position since the axial position of spindle 14 is such that openings 26 and 28 do not communicate with the inlet ports 30 and 32. In this position of the spindle the seals 38 and 40 spring pressed against the exterior of spindle 14 effectively prevent the flow of water through the valve. To open the valve the spindle 14 is moved axially to place the openings 26 and/or 28 in register with the inlet ports 30 and 32 to allow fluid to flow into interior passage 20 and into chamber 18 through outlet tube 50 and out through aerating attachment 52. The temperature of the water is adjusted by rotating the spindle 14 about its axis to vary the degree of registration between openings 26 and 28 and their associated inlet ports 30 and 32 respectively. The operation of the valve described herein is identical with that described in pending application of Argyris et al, Ser. No. 572,397, filed Apr. 28, 1975 assigned to the assignee hereof, and further description thereof is not felt to be necessary.

The lower and upper ends of the spindle 14 are sealed with respect to bore 12 by means of annular resilient seals 60 and 62 respectively. Thus, escape of water between the spindle 14 and bore 12 is effectively prevented.

Near the upper end of spindle 14 annular shoulders 66 and 68 are formed between which seal 62 is retained and a reduced portion 70 of the spindle projects partially beyond the body 10. A stop member 72 identical to that disclosed in a co-pending application of Argyris et al, Ser. No. 550,290 assigned to the assignee hereof and now U.S. Pat. No. 4,015,817 has ribs 74 and 76 which are received in segmental grooves 78 and 80 formed on the exterior of body 10 near its upper extremity by means of which the stop member 72 is mounted on the upper extremity of the body 10, in the manner as described in said pending Ser. No. 550,290. An operating knob 82 is retained on the end of portion 70 of spindle 14 by means of a retainer ring 84 and has abutment stops formed on the interior surface thereof which cooperate with rotary abutment stops formed on the exterior of stop member 70 to limit rotational movement of the spindle 14 between extreme hot and cold positions in the same manner as the valve described in Ser. No. 550,290.

A housing assembly indicated generally by the numeral 90 is made up of a main portion 92 which envelopes substantially all of the body 10 and the outlet conduit 50 except for an opening directly beneath the conduit and the body 10 which is closed by bottom housing portion 94. Housing portion 92 is secured to the body 10 by means of screws 96 passing through ears 98 (FIG. 2) formed on the body 10 and threaded into bosses 100 formed on the interior of housing portion 92. As shown in FIG. 1 housing portion 94 is secured to housing portion 92 by means of two screws 102 which are threaded into bosses 104 (only one of the screws 102 and bosses 104 being shown) formed on the interior of that portion of the body portion 92 which overlies conduit 50, the bosses 104 projecting from the interior of housing portion 92 on either side of the conduit 50. Housing member 92 generally overlies a base member 106 which may be made of plastic or any other suitable material. Projecting upwardly from base member 106 from a position directly beneath body 10 and spindle 14 is a leak receptacle 108 which is cylindrical in form, the top of which is cut at an angle to coincide with and accommodate the angular orientation of the body 10 and spindle 14. In the forward wall portion of the receptacle 108 is slot 110 the bottom of which registers with an opening 112 located at the bottom of lower housing portion 94. Thus the interior of the receptacle 108 communicates through slot 110 and opening 112 to the outside of the housing. As can be readily understood, the leak receptacle 108 is in a position directly beneath the spindle so that any leakage between the resilient seal 60 and bore 12 will drop directly beneath into receptacle 108 and will flow through slot 110 and openings 112 to outside of the housing where it is visible and where it will readily find its way into the sink drain. Without such a receptacle and without the means to conduct it to the outside of the housing any such leakage could accumulate within the housing and could find its way via the openings in the sink which accommodate inlet tubes 36 and 34 to the floor or cabinet beneath the sink.

Drain rod 120 is slidably received in bushing 124 which in turn is threaded into cylindrical bushing boss 122 formed integrally on the interior of housing portion 92. Rod 120 is connected to the sink drain plug to permit opening and closing thereof and constitutes no part of the invention herein.

FIGS. 3, 4 and 5 show the instant invention as used in a bathtub/shower valve which projects horizontally from the wall above a bathtub. The valve of this embodiment and its operation are identical to the valve described in connection with the embodiments of FIGS. 1 and 2 except that the valve is mounted horizontally to project outwardly from the wall in FIGS. 3, 4 and 5 embodiment instead of being essentially vertically oriented as in the case of the FIGS. 1 and 2 embodiment. Certain components of the FIGS. 3, 4 and 5 embodiment which correspond to the parts of the FIGS. 1 and 2 embodiment are similarly numbered. One end of outlet conduit 50 is secured as by soldering or other suitable means to the body 10 and communicates with the chamber 18 by means of suitable interior passages formed in the body 10. The other end of the conduit 50 is connected to either the bathtub spout or to the showerhead by means of apparatus well known to those skilled in the art and which constitutes no part of the invention herein. Housing 136 encloses a substantial part of the body 10 within it and is adapted to abut against the wall 130. An escutcheon 138 is secured to the wall by means of screws (not shown) in surrounding relation to housing 136 at the point where the housing abuts against the wall. Seal 140 prevents the passage of water between the wall and the escutcheon 138. A leakage receptacle 150 shown in detail in FIG. 5 is preferably made out of some inexpensive plastic material but may be made from any other rigid material. Receptacle 150 has generally triangular shaped side walls 152 and a rear wall 154. Bottom wall 156 is angularly disposed with respect to the rear wall 154 and has formed in it a substantially cylindrical recess wall 158 by means of which receptacle 150 is adapted to be received on outlet tube 50 in a position contiguous to the end of spindle 14 which carries seal 60. Bottom wall 156 and side walls 152 form with recess wall 158 a pair of angularly disposed troughs on either side of recess 158 which, as shown in FIG. 4, terminate with their lower portion just above opening 160 in housing 136. Thus it can be seen any leakage of water between the spindle 14 and bore 12 around seal 60 will be received in receptacle 150 and conducted by means of the troughs formed between bottom wall 156, side wall 152 and recess wall 158 to a point just above the opening 160 in housing 186 where the leakage will then drop down into the tub and will be carried away by the drain. Without such a receptacle to dispose of leakage in the manner described, any such leakage would be contained within the housing 136 and would eventually find its way through the opening 132 in wall 130 where it would eventually cause damage to the wall or cause other damage.

The invention described herein therefore provides a means to conduct any leakage from between the spindle and the bore of a valve of the type described to a point exterior of the housing where it can be readily seen and disposed of in the manner which will not damage the structure to which the valves are mounted or otherwise create undesirable effects.

It will be apparent to persons skilled in the art that various modifications and adaptations and variations of the foregoing specific disclosure can be made without departing from the spirit or teachings of the present invention.

We claim:

1. A valve adapted to be mounted on a deck comprising a body having a bore open at least at one end, inlet and outlet ports in said body communicating with said bore, a closure member mounted for movement in said bore between a closed position where flow between said inlet and outlet ports is blocked and an open position where said inlet and outlet ports are in communication with each other, a base member adapted to be mounted on said deck beneath said body, conduit means formed integrally on said base member directly beneath said one end of said bore for conducting fluid leakage between said bore and said closure member away from the vicinity of said one end of said bore.

2. The valve according to claim 1 together with a housing enclosing said body, an opening in said housing, said conduit extending from said one end of said bore to said opening in said housing to conduct leakage fluid from said one end of said bore to said opening in said housing.

3. A valve adapted to be mounted on a deck comprising a body having a bore at least one end of which is open, inlet and outlet ports in said body communicating with said bore, a spindle mounted for movement in said bore between a valve closed position where communication between said inlet and outlet ports is blocked and a valve open position where said inlet and outlet ports are in communication with each other, a base member adapted to be mounted on said deck beneath said body, leak receptacle means formed integrally on said base member beneath said one end of said bore and positiond to receive any fluid leakage between said bore and said spindle.

4. The valve according to claim 3 together with a housing enclosing said body and said leak receptacle means, an opening in said housing, said receptacle communicating with said opening to conduct leakage fluid from said bore to said opening.

* * * * *